United States Patent Office 3,092,630
Patented June 4, 1963

3,092,630
PREPARATION OF N-SUBSTITUTED-3-MORPHOLONES
Samuel A. Glickman, Easton, and Herman S. Schultz, Lansdowne, Pa., assignors to General Aniline & Film Corporation, New York, N.Y., a corporation of Delaware
No Drawing. Filed Dec. 19, 1958, Ser. No. 781,459
6 Claims. (Cl. 260—247.7)

The present invention relates to N-substituted-3-morpholones and particularly to an improved process of preparing the same from a 2-p-dioxanone and primary amines in a closed system.

Several species of N-substituted-3-morpholones are known. These compounds have many interesting and useful applications in organic syntheses. There are several methods for preparing the said species. One method consists of the reaction of N-methyl ethanolamine with sodium in toluene followed by the addition of ethyl chloroacetate to give N-methyl-3-morpholone in 65% yield (P. Vieles et al. Bull. Soc. Chem. France, pages 1210–12, 1956). The physical constants obtained by these investigators indicate that an impure product was obtained. The same reference describes a similar preparation of N-methyl-3-morpholone which involves the reaction of 3-morpholone with an equimolar amount of sodium ethylate in a 50% solution of absolute ethanol heated in a sealed tube for 6 hours to give an unstated yield.

Another method described by A. L. Morrison et al. in J. Chem. Soc., page 2887, 1950, involves the synthesis of N-methyl,2,2-dibenzyl-3-morpholone by the reaction of sodium 1-2(dimethyl aminoethoxy)1,1-dibenzyl acetate and thionyl chloride. This procedure illustrates the difficulty involved in synthesizing N-substituted-3-morpholones. In fact the prior art is replete with multi-step processes for preparing the product via an intermediate which is extrtmely difficult, particularly in preparing morpholones of the N-alkyl and N-aryl series.

It is an object of the present invention to provide an improved process of preparing N-substituted-3-morpholones from an alkyl substituted or unsubstituted 2-p-dioxanone and a primary aliphatic or aromatic amine.

Other objects and advantages will become more clearly apparent from the following description.

We have found that N-substituted-3-morpholones can be obtained in high yields by reacting any primary aliphatic or aromatic amine with either 2-p-dioxanone, 6-methyl-2-p-dioxanone or 3,5-dimethyl-2-p-dioxanone in the presence of a small amount of an inert solvent, preferably in the absence of an inert solvent, in a closed system at a temperature of 250° to 450° C., preferably at a temperature of 300° to 360° C., so as to raise the pressure to a sufficient level to effectuate the reaction without allowing any of the reactive component from escaping from the reaction vessel.

The condensation reaction may also be conducted at atmospheric pressure in the presence of a small amount of an inert azeotropic solvent, such as xylene, benzene, tetrahydronaphthalene, etc., to remove the water formed during the reaction mixture at a pot temperature above 270° C. If on the other hand, it is preferred to conduct the reaction in the absence of an azeotropic solvent, then in such case an excess of the primary aliphatic or aromatic amine is used to distill off the water. The amount of primary aliphatic or aromatic amine to be employed may be anywheres from 1.5 to 5 moles of amine per mole of alkyl substituted or unsubstituted 2-p-dioxanone.

In the closed system reaction, the pressure reaction vessel may consist of any of the conventional apparatus now employed for conducting reactions under pressure. The standard rocking autoclave used for batch processes may be employed in accordance with the present invention to give substantially quantitative conversion of N-substituted-3-morpholones when conducted at the foregoing temperature ranges. In lieu thereof, autoclaves provided with good mechanical stirrers or a continuous flow apparatus may also be employed advantageously. When a closed system of the continuous flow type is employed, the temperature may be increased to 400° C. and even as high as 450° C. For batch equipment such as an autoclave, the temperature may range to as high as 400° C. It is possible that the reaction may be conducted at above this temperature but the exact point thereof is not known since this, as is apparent to persons skilled in the art, would depend on the interplay with the other variables and the type of autoclave used. For example, a higher temperature may be more desirable if a flow system with a relatively short contact time is used. In such case, an upper limit of 450° C. may be employed to give substantially quantitative conversion of the N-substituted-3-morpholones.

As noted from the foregoing discussion, the pressure developed will depend upon the temperature employed. In general the temperature developed in the reaction vessel, whether of the batch autoclave type or continuous flow system, is believed to be due to the excess of the primary amine and the water produced during the reaction. This pressure, which may range from 200 to upwards of 2000 pounds per square inch, is sufficient to keep most of the reactants in the liquid phase.

The 2-p-dioxanone and the amine are required in equimolar amounts, but for various reasons it is desirable to use as much as two moles of a primary aliphatic or aromatic amine per mole of 2-p-dioxanone in the presence or absence of inert solvent.

The time of reaction is variable and will depend upon the type of apparatus employed. Surprisingly, the best yield (93%) is obtained in a rocking autoclave at a temperature range of 250°–450° C. The pressure developed in the reaction is super-atmospheric since the temperature used is above the boiling point of the primary reactants plus the water produced in the reaction. The pressure, which may range anywheres from 200 pounds per square inch to 2000 pounds or more per square inch, is sufficient to keep most of the coreactants in the liquid phase. The reaction appears to be much slower at a lower temperature, i.e. 250° C. from an examination of the pressure curve. If the reaction is conducted at 300° C. the pressure will rise continuously during the heat-up period, but was incomplete when the working temperature of 300° C. was attained. At 340° C. most of the pressure increase was present by the time the working temperature of 340° C. was attained although a slight upward drift of pressure continued.

The dioxanones which we employ are, as noted above, either 2-p-dioxanone, 6-methyl-2-p-dioxanone and 3,5-dimethyl-2-p-dioxanone. However, for the purpose of the present invention, we prefer to employ dioxanones prepared in accordance with the procedure described in application Serial No. 781,458, filed on even date, because of the high yields and fairly high grade of purity. The 6-methyl derivative is prepared in accordance with Example IV of U.S.P. 2,807,629 and the 3,5-dimethyl derivative is prepared in accordance with Example II of the same patent. The products are obtained in pure form by recrystallization of the reaction mass from solvents, such as benzene, toluene, isopropyl alcohol, or acetone, or if desired, by distillation or a combination of these two methods.

The foregoing dioxanones are condensed with any primary aliphatic or aromatic amine. The nature or character of the amine is immaterial so long as it is of primary character and does not contain any substituents other than alkyl groups. The amine may be either liquid or solid. If solid, it will be in the liquid phase under reaction conditions. As examples of such amines, the following are illustrative:

| | |
|---|---|
| Methylamine | Hexylamine |
| Ethylamine | Isohexylamine |
| Propylamine | Heptylamine |
| Isopropylamine | Octylamine |
| Butylamine | Nonylamine |
| Sec-butylamine | Decylamine |
| Isobutylamine | Hendecylamine |
| Tert-butylamine | Dodecylamine |
| Amylamine | Cetylamine |
| Isoamylamine | Octadecylamine |
| Tert-amylamine | 2-octadecylamine |

Abietinylamine (abietylamine), i.e. primary amine made from a modified rosin and available commercially as Rosin Amine D having the following formula:

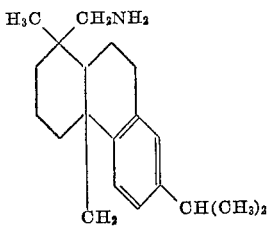

Dehydroabietinylamine
Brassidylamine
Undecenylamine
Cyclohexylamine
Aniline
Toluidines
Xylidines
Benzylamine
Nonylbenzylamine
Nonylnaphthylmethylamine
Dodecylbenzylamine
Octylbenzylamine
Diamylbenzylamine
Methoxyphenylamine
α-Naphthylamine
β-Naphthylamine
Ar(1)-tetrahydro-α-naphthylamine
Ac-tetrahydro-α-naphthylamine
Cumidine
2,4-dimethyl aniline
p-Phenetidine In lieu of the foregoing amines, a mixture of commercially available amines having the following compositions may also be employed:

| | Percent |
|---|---|
| Hexadecylamine | 10 |
| Octadecylamine | 10 |
| Octadecenylamine | 35 |
| Octadecadienylamine | 45 |
| | |
| Octadecenylamine | 15 |
| Octadecadienylamine | 15 |
| Abietylamine | 70 |
| | |
| Hexadecylamine | 7 |
| Octadecylamine | 92 |
| Octadecenylamine | 1 |

In conducting the reaction in an autoclave either of the rocking or stirrer type, it may be desirable to purge the autoclave with nitrogen after the addition of a dioxanone and prior to the addition of an amine.

The following examples will further illustrate the improved process of the present invention. All parts given are by weight unless otherwise noted.

*Example I*

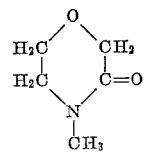

100 grams of 93.9% 2-p-dioxanone (equivalent to 0.92 mole pure 2-p-dioxanone) were charged into a 300 cc. autoclave and the autoclave purged with nitrogen. 37 grams of methylamine (1.19 moles) were then charged into a 300 cc. rocking autoclave. Pressure rose to 250 p.s.i.g. as temperature rose to 250° C. in the course of 3¾ hours. Pressure rose to and remained at 300 p.s.i.g. at 250° C. in the course of 6¾ hours longer. Water was fractionated off using benzene as an azeotroping material. Final distillation through a Vigreaux column gave a cut at 74–100° C. at 3 mm. which is mainly N-methyl-3-morpholone. The overall yield by analyses of this cut was 29.1%. The remainder had properties which indicated it to be essentially intermediate N-methyl, (β-hydroxyethoxy) acetamide. The N-methyl-3-morpholone is soluble in water, ether and benzene while the intermediate hydroxy amide is soluble in water but essentially insoluble in ether or benzene. This can be used as the basis for an extraction procedure.

*Example II*

A reaction with 2-p-dioxanone and methylamine was carried out essentially in the same way as Example I except for the temperature. Pressure rose from 0 to 630 p.s.i.g. as the temperature rose from 18° C. to 300° C. in the course of 3½ hours. In 2 hours 50 minutes longer pressure rose further to 900 p.s.i.g. at 300° C. Pressure then rose slowly and stayed at 1000 p.s.i.g. in the course of 5 hours and ten minutes longer before the heat was turned off. Careful fractionation and analysis showed the yield of N-methyl-3-morpholone to be 86%. The physical constants of pure fractions are B. P. 86–87° C. at 2 mm. $n_D^{26}$ 1.4773–1.4782 F. P. is —8.63° C.

The structure of N-methyl-3-morpholone was shown by C, H, N analyses, negligible hydroxyl number analysis, direct analysis for a lactam structure and examination of the infrared spectrum. The product also does not saponify in room temperature alkali in contradistinction to a very rapid saponification with starting 2,p-dioxanone. It is presumed that the products obtained as above from other primary amines are homologues of N-methyl-3-morpholone. Quantitative analysis for C, H, N and lactam structure is used in the following preparations as well as examination of infrared spectra.

*Example III*

Reaction between 2-p-dioxanone and methylamine was carried out essentially as in Example I except for the temperature. Pressure rose from 300 p.s.i.g. to 1320 p.s.i.g. as temperature rose from room temperature to 340° C. in the course of 2 hours 25 minutes. The pressure then rose to 1600 p.s.i.g. and 342° C. in 2 hours 20 minutes longer. The reaction ran at about 340° C. for 7 hours 40 minutes longer during which time pressure rose to and hovered at about 1850 p.s.i.g. before heat was shut off. The product analyzed for 93% N-methyl-3-morpholone.

*Example IV*

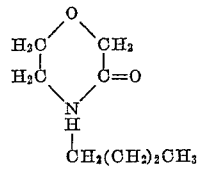

136 grams (1.85 moles) of n-butylamine and 158 grams (1.55 moles), of 2-p-dioxanone were reacted as in Example I in a rocking autoclave at 320° C. The crude product analyzed for 84.2% N-butyl-3-morpholone. Careful fractionation essentially corroborated this analysis. Physical constants are P. B. 97–99° C. (at 1.5 mm.), 110 at 4 mm. $n_D^{25}$ 1.4702 and the structure was confirmed by infrared spectrum, C, H and N analyses and lactam analysis.

*Example V*

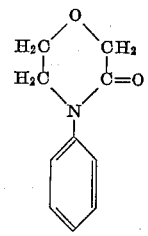

300 grams (2.94 moles) of 2-p-dioxanone and 329 grams (3.53 moles) of aniline were reacted in a rocking autoclave as in Example I but at 340° C. An appreciable yield of N-phenyl-3-morpholone was obtained by distillation and recrystallization. The product melting at 113–114° C. was shown to have the correct structure by examination of the infrared spectrum and C, H and N analyses.

*Example VI*

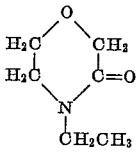

212 grams (4.72 moles) of ethylamine and 400 grams (3.9 moles) of 2-p-dioxanone were reacted as in previous examples in a rocking autoclave at 340° C. Fractionation show the yield of N-ethyl-3-morpholone to be 78%. Physical constants are B. P. 97° C. at 6 mm. and $n_D^{25}$ 1.4730. The structure was confirmed by infrared spectrum and C, H and N analyses.

*Example VII*

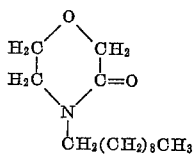

348 grams (2.1 equivalents) of Armeen 10D (a composition consisting of 90% decylamine, 4% octylamine and 6% dodecylamine) and 204 grams (2 moles) of 2-p-dioxanone were reacted as in previous examples in a rocking autoclave at 340° C. The yield of N-alkyl-3-morpholone was estimated as 80% after distillation and was mainly N-decyl-3-morpholone. The boiling point range is 150–189° C. at 1½ to 3 mm. and $n_D^{20}$ 1.4662–1.4690. The structure was confirmed by infrared spectra on fractionation cuts.

*Example VIII*

420 grams (1.5 equivalents) of Armeen 18D (a composition consisting of 90% octadecylamine, 6% hexadecylamine and 4% octadecenylamine) and 153 grams (1.5 moles) of 2-p-dioxanone were reacted as in previous examples in a rocking autoclave at 340° C. Functional group analysis gives a yield of 67% for N-alkyl-3-morpholone product. Most of this is N-octadecyl-3-morpholone. Distillation of a portion shows the product to be a low melting waxy solid (melts on steam bath). The structure was confirmed by the use of infrared spectra.

In lieu of a pressure vesesl such as an autoclave, the condensation of a dioxanone with the amine may also be conducted at atmospheric pressure while employing a small amount of azeotropic solvent to remove the water formed during the reaction. The following example will illustrate this procedure.

*Example IX*

179.3 grams (0.718 mole) of Armeen 16D (a composition consisting of 92% octadecylamine, 6% hexadecylamine and 1% of octadecenylamine) having a combining weight of 250 were charged into a 4-necked flask equipped with a stirrer, thermometer, Dean-Stark tube, nitrogen gas inlet and condenser. 77.4 grams of 96.5% purity of 2-p-dioxanone (0.73 mole) was added rapidly to the stirring amine. The temperature shot spontaneously from 40° C. to 110° C. The temperature was raised by heating to 200° C. in 45 minutes. At this point 50 cc. of xylene was added by way of the condenser. A nitrogen atmosphere was maintained throughout the reaction. Xylene was slowly removed till pot temperature reached 290° C. (with stirring). At this temperature water plus other materials began azeotroping over at a regular rate. The process was continued at 290–310° C. pot temperature until no more material azeotroped over. The residual xylene was removed by heating to 210° C. under vacuum. Analyses showed no free amine and no more than 32% intermediate hydroxy amide. The main product is N-hexadecyl-3-morpholone. This product (a lactam) would not analyze by the methods used to analyze for amides, OH groups and free amines. The presence of desired structure was shown by infrared spectrum.

*Example X*

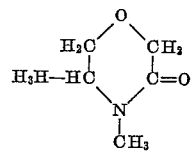

Example I was repeated with the exception that 100 grams of the 2-p-dioxanone were replaced by 114 grams of 6-methyl-2-p-dioxanone and the methylamine amount increased to 60 grams at a temperature of 340° C. rather than 250° C. The water was fractionated off while employing benzene as the azeotropic solvent. Final distillation through a Vigreaux column gave a colorless oil in good yield, which is mainly N-methyl-5-methyl-3-morpholone.

*Example XI*

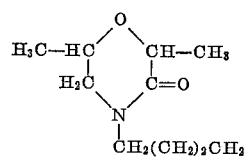

Example X was repeated with the exception that 114 grams of 6-methyl-2-p-dioxanone were replaced by 128 grams of 3,5-dimethyl-2-p-dioxanone and 60 grams of methylamine were replaced by 90 grams of butylamine. The N-butyl-2,6-dimethyl-3-morpholone was recovered by distillation of the reaction mixture in good yield.

The N-alkyl-substituted-3-morpholones, particularly those containing from 1 to 12 carbon atoms, are particularly valuable as solvents for homopolymers and copolymers of various types, such as for example, polyvinyl pyrrolidone, polyvinyl ethers, polyvinyl esters, e.g. polyvinyl chloride, polyvinyl acetate, polyvinyl butyrate, etc. and as solvents for gases such as carbon monoxide, carbon dioxide, nitrogen and especially acetylene. The N-substituted-3-morpholones in which the N-substituent is either an alkyl, cycloalkyl or aryl group of more than 12 carbon atoms are semi-viscous liquids or low melting solids and as such are useful as intermediates for the preparation of useful compounds, e.g. by opening the lactam ring. The higher members, e.g. alkyl of 10 to 18 carbon atoms are valuable plasticizers for cellulosic and vinyl ester polymers.

We claim:

1. The process of preparing N-substituted-3-morpholones which comprises condensing 1 mol of a dioxanone selected from the group consisting of 2-p-dioxanone, 6-methyl-2-p-dioxanone and 3,5-dimethyl-2-p-dioxanone with 1 to 5 moles of a primary hydrocarbon amine selected from the class consisting of alkyl, cycloalkyl and aryl primary amines at a temperature of 300–360° C. and a pressure ranging from atomspheric to 2000 p.s.i.g.

2. The process according to claim 1 wherein the primary hydrocarbon amine is methylamine.

3. The process according to claim 1 wherein the primary hydrocarbon amine is N-butylamine.

4. The process according to claim 1 wherein the primary hydrocarbon amine is aniline.

5. The process according to claim 1 wherein the primary hydrocarbon amine is ethylamine.

6. The process according to claim 1 wherein the primary hydrocarbon amine is octadecylamine.

References Cited in the file of this patent

UNITED STATES PATENTS

| 2,786,834 | Rice et al. | May 26, 1957 |
| 2,802,003 | Grogan et al. | Aug. 6, 1957 |

FOREIGN PATENTS

| 770,624 | Great Britain | Mar. 20, 1957 |
| 785,142 | Great Britain | Oct. 23, 1957 |

OTHER REFERENCES

Spath et al.: Ber. Deut. Chem. Gesell., volume 69, pages 2727–2731 (1936).

Syn. Org. Chem., Wagner et al., John Wiley and Sons, New York, page 576 (1953).

Germany, C 10,125 IV b/12p, July 19, 1956.